March 31, 1931.  A. P. THURSTON  1,798,915
AIRCRAFT
Filed Dec. 21, 1928  2 Sheets-Sheet 1
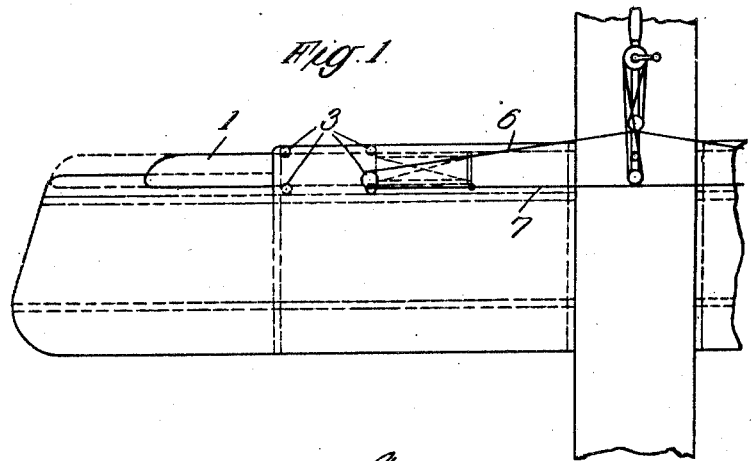
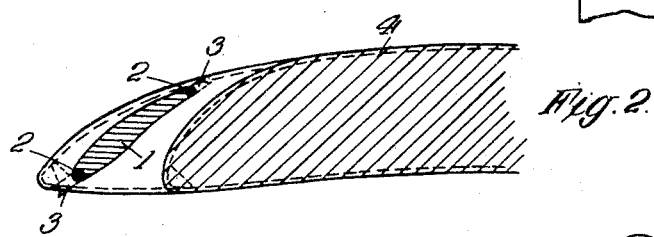
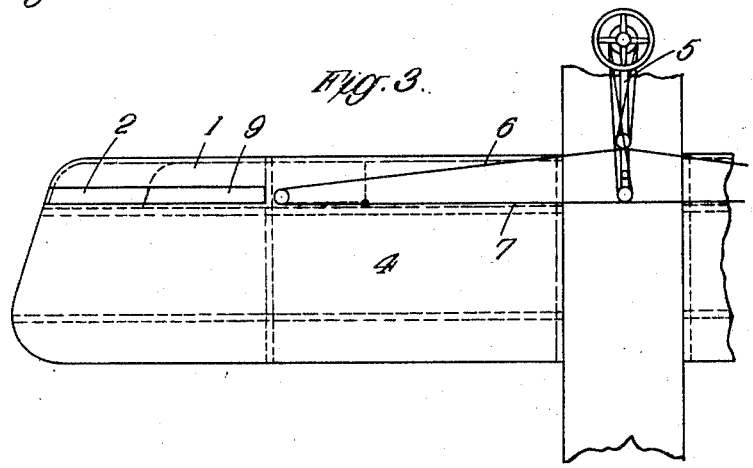
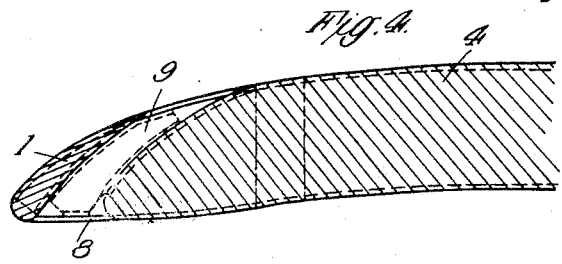
Albert Peter Thurston
INVENTOR;

March 31, 1931.  A. P. THURSTON  1,798,915
AIRCRAFT
Filed Dec. 21, 1928     2 Sheets-Sheet 2
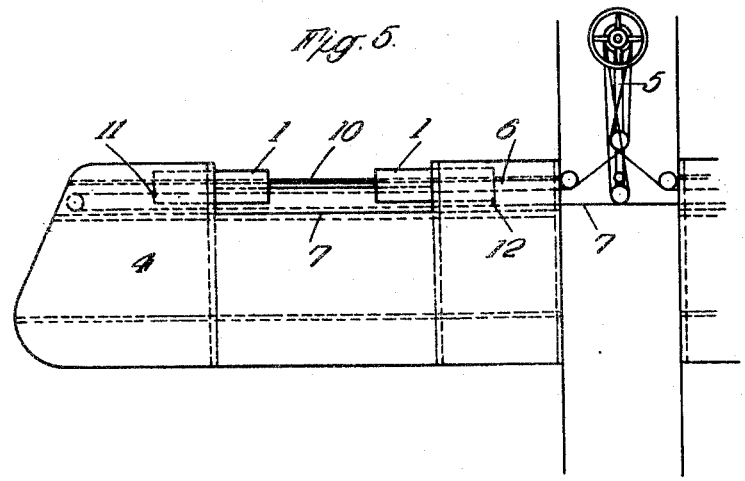
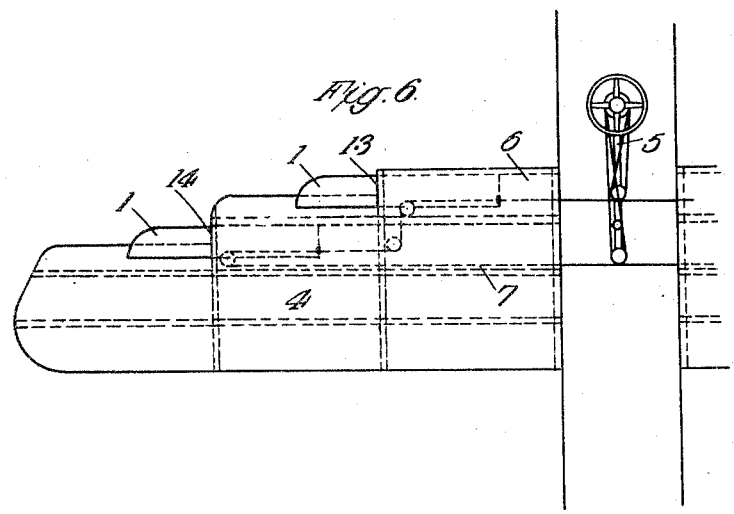
Albert Peter Thurston
INVENTOR;
By
Attorney Patented Mar. 31, 1931

1,798,915

UNITED STATES PATENT OFFICE

ALBERT PETER THURSTON, OF LONDON, ENGLAND

AIRCRAFT

Application filed December 21, 1928, Serial No. 327,596, and in Great Britain February 2, 1928.

This invention relates to aircraft having alulas mounted in front of or above the shaped leading edge of the wing or plane to form with the shaped leading edge a gap backwardly inclined upwards at a negative angle with the wing or plane.

According to this invention a wing or plane having an alula or small plane as above set forth is provided with means for varying the effective length of the alula, or to express it differently, the length of the gap between the alula and the wing or plane, for the purpose of controlling the machine. The alulas or small planes are preferably mounted so that they remain at a constant distance from the wing or plane in the position found by experience to give the best results in controlling the machine.

Various constructional embodiments of the invention will now be described with reference to the accompanying drawings, wherein:—

Figure 1 is a diagrammatic plan view of a wing provided with an end sliding alula.

Figure 2 is a cross section of Figure 1 to an enlarged scale.

Figure 3 is a plan view of a modification.

Figure 4 is a cross section of Figure 3 to an enlarged scale.

Figure 5 is a plan view of another modification.

Figure 6 is a plan view of still another modification.

Referring to Figures 1 and 2, the alulas 1 are provided with parallel rails or guides 2 which run on ball races or rollers 3 in the nose of the wing 4 so that the said alulas can be moved along the step 4a at the end of the wing in a line or plane substantially at right angles to the air pressure, whereby the control is unaffected by the said pressure. The alulas 1 are operated from the joy-stick 5 by cables 6, 7 in the well known manner so that they may be either differentially or similarly extended or retracted simultaneously on both sides of the machine.

In the modification shown in Figures 3 and 4, the alula 1 is fixed and the gap 8 between it and the nose of the wing is varied in length by a slide 9 which runs on anti-friction rollers and is controlled by cables 6, 7 from the control column 5, thus varying the effective alula length.

In the modification shown in Figure 5 the nose of each wing is provided with a recess 10 and alulas 1 are slidably mounted within housings provided in the nose of the wing on each side so as to be longitudinally projectable along its axis from the sides of the recess to vary the effective alula length. The alulas are controlled by the control wheel and column 5. The cable 6 is attached at 11 to one alula 1 and the cable 7 at 12 to the other alulas so that they move in opposite directions simultaneously. Side motion of the control column operates differentially the alulas on opposite sides of the machine and rotation of the wheel operates the alulas similarly on both sides of the machine.

In the modification shown in Figure 6 the wings are provided with two steps 13, 14 in the sides of each of which is housed an alula 1. These alulas are operated similarly or differentially from the control wheel and column 5 by means of the cables 6, 7.

The means for controlling the movements of the alulas or slides from the joy-stick or control column may conveniently be such as are described in prior British Patent No. 180,359.

I claim:—

1. Aircraft including a wing, the entering edge of the aircraft being recessed so as to form a step between the tip of the wing and its inner end, and an alula projectable from the side of the step longitudinally of the wing.

2. Aircraft including a wing, means defining a slot toward the leading edge of said wing, and means movable longitudinally of the wing to vary the effective length of said slot.

3. Aircraft including a wing, an alula associated with the entering edge of said wing to define a slot between the alula and the entering edge of said wing, and means for varying the longitudinal extent of said slot.

4. Aircraft including a wing, said wing cut away to form a shoulder between the tip of the wing and its inner end, an alula operatively associated with the entering edge of said wing to define a slot between the alula and the entering edge of said wing adjacent said shoulder, and means extensible from said shoulder longitudinally of the wing to close the slot to a variable degree so as to vary the effective length of said slot.

ALBERT PETER THURSTON.